(12) United States Patent
Yan et al.

(10) Patent No.: US 12,723,763 B2
(45) Date of Patent: Sep. 1, 2026

(54) CONTROL METHOD FOR RANGE HOOD AND RANGE HOOD

(71) Applicant: FOSHAN SHUNDE MIDEA WASHING APPLIANCES MANUFACTURING CO., LTD., Foshan (CN)

(72) Inventors: Xueping Yan, Foshan (CN); Changyang Qiu, Foshan (CN)

(73) Assignee: FOSHAN SHUNDE MIDEA WASHING APPLIANCES MANUFACTURING CO., LTD., Foshan (CN)

(*) Notice: Subject to any disclaimer, the term of this patent is extended or adjusted under 35 U.S.C. 154(b) by 895 days.

(21) Appl. No.: 17/709,343

(22) Filed: Mar. 30, 2022

(65) Prior Publication Data

US 2022/0221160 A1 Jul. 14, 2022

Related U.S. Application Data

(63) Continuation of application No. PCT/CN2019/125831, filed on Dec. 17, 2019.

(30) Foreign Application Priority Data

Sep. 30, 2019 (CN) ......................... 201910945400.2

(51) Int. Cl.
*F24C 15/20* (2006.01)
*F24D 19/00* (2006.01)
(Continued)

(52) U.S. Cl.
CPC ...... *F24C 15/2021* (2013.01); *F24C 15/2042* (2013.01); *F24C 15/20* (2013.01);
(Continued)

(58) Field of Classification Search
CPC .. F24C 15/2021; F24C 15/20; F24C 15/2042; G01F 15/061; G01F 15/068; F24D 19/0092
(Continued)

(56) References Cited

U.S. PATENT DOCUMENTS 10,451,303 B1* 10/2019 Jasteh ...................... F24F 11/38
2017/0234578 A1* 8/2017 Sato .................... F24D 19/0092 165/11.1

FOREIGN PATENT DOCUMENTS

CN 103644583 B 2/2016
CN 205102213 U 3/2016
(Continued)

OTHER PUBLICATIONS

CN-107781878-A—Translation (Espacenet) (Year: 2018).*
(Continued)

*Primary Examiner* — Helena Kosanovic
*Assistant Examiner* — Benjamin W Johnson
(74) *Attorney, Agent, or Firm* — K&L Gates LLP

(57) ABSTRACT

The present disclosure provides a control method for a range hood and a range hood. The range hood includes a fan, and the control method includes: collecting a current operating state parameter of the fan; determining a current air duct parameter based on the current operating state parameter; and controlling operations of the fan based on the current air duct parameter and a predetermined control policy.

6 Claims, 11 Drawing Sheets

(51) Int. Cl.
*G01F 15/06* (2022.01)
*G01F 15/061* (2022.01)

(52) U.S. Cl.
CPC ........ *F24D 19/0092* (2013.01); *G01F 15/061* (2013.01); *G01F 15/068* (2013.01)

(58) Field of Classification Search
USPC ........................................................ 126/299 D
See application file for complete search history.

(56) References Cited

FOREIGN PATENT DOCUMENTS

| | | | | | |
|---|---|---|---|---|---|
| CN | 107101234 | A | | 8/2017 | |
| CN | 107781878 | A | * | 3/2018 | .......... F24C 15/2021 |
| CN | 109114608 | A | | 1/2019 | |
| CN | 105674359 | B | | 6/2019 | |
| CN | 109838824 | A | | 6/2019 | |
| CN | 109855144 | A | | 6/2019 | |
| CN | 110107938 | A | | 8/2019 | |
| CN | 110207225 | A | * | 9/2019 | .......... F24C 15/2021 |
| CN | 110486773 | A | | 11/2019 | |
| DE | 102013204135 | A1 | | 9/2014 | |
| DE | 202018105587 | U1 | | 11/2018 | |
| ES | 2396831 | A1 | | 2/2013 | |

OTHER PUBLICATIONS

CN-110207225-A—Translation (Year: 2019).*
ISR of PCT Application No. PCT/CN2019/125831.
First OA of CN Application No. 201910945400.2.
Notification to Grant Patent Right for Invention of CN Application No. 201910945400.2.
Extended European Search Report issued Sep. 29, 2022 of Application No. 19947906.4.
Second office action received in the counterpart European application 19947906.4, mailed on Sep. 6, 2023.

* cited by examiner

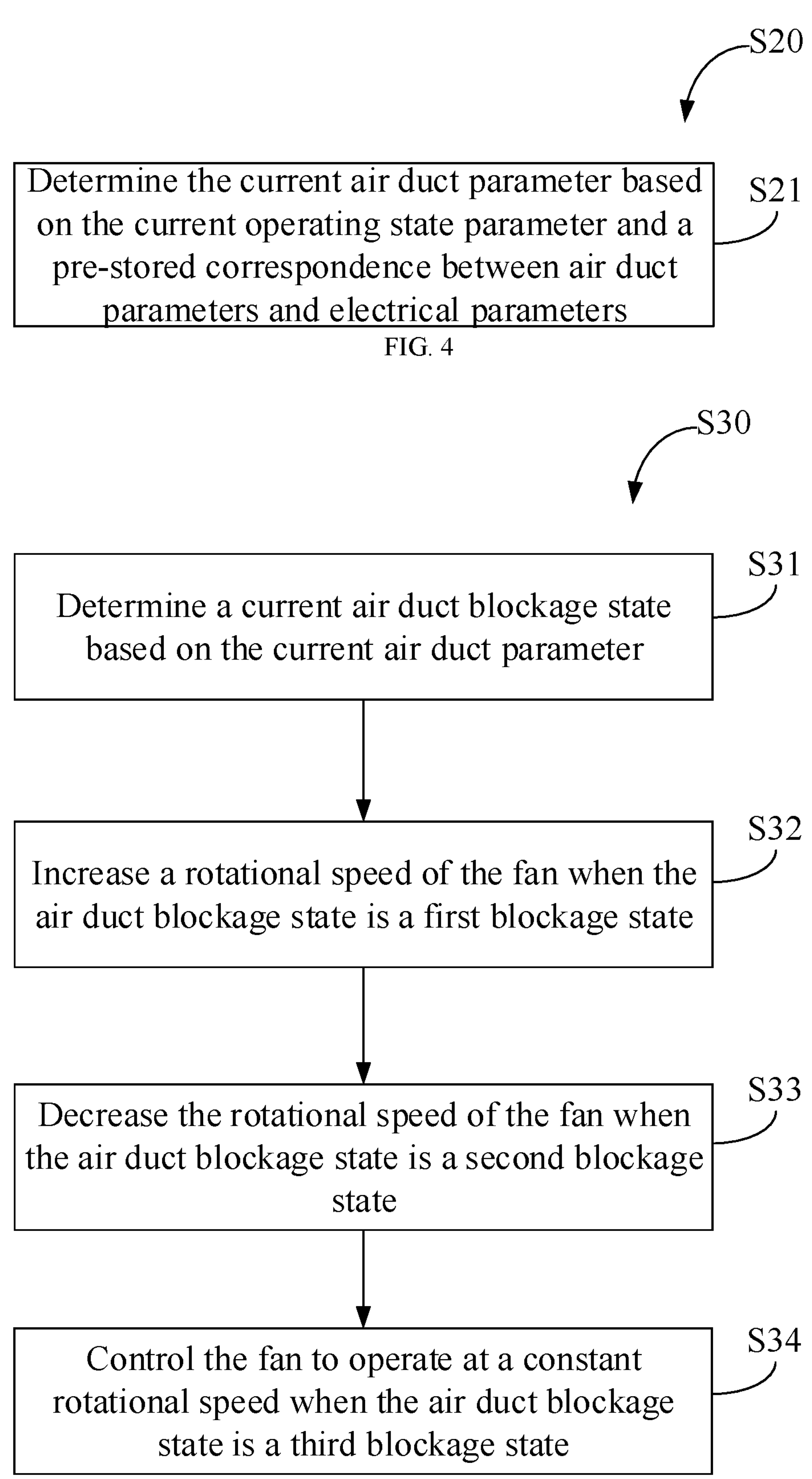
S20
Determine the current air duct parameter based on the current operating state parameter and a pre-stored correspondence between air duct parameters and electrical parameters
S21
FIG. 4
S30
Determine a current air duct blockage state based on the current air duct parameter
S31
Increase a rotational speed of the fan when the air duct blockage state is a first blockage state
S32
Decrease the rotational speed of the fan when the air duct blockage state is a second blockage state
S33
Control the fan to operate at a constant rotational speed when the air duct blockage state is a third blockage state
S34
FIG. 5

CONTROL METHOD FOR RANGE HOOD AND RANGE HOOD

CROSS-REFERENCE TO RELATED APPLICATIONS

This application is a continuation of International Application No. PCT/CN2019/125831 filed on Dec. 17, 2019, which claims priority to Chinese patent application No. 201910945400.2, filed with China National Intellectual Property Administration on Sep. 30, 2019, which are both incorporated herein by reference in their entireties.

FIELD

The present disclosure relates to kitchen appliances, and more particularly, to a control method for a range hood and a range hood.

BACKGROUND

A range hood is typically used to quickly extract combustion waste from a stove and oil fumes that are harmful to human as generated during a cooking process, and discharge them to outdoors, to reduce indoor pollution and purifying the air. During the use of the range hood, when the volume of oil fumes increases or the air pressure in the air duct increases, it is necessary to adjust the rotational speed of the fan to increase the air extraction volume and to improve the fume extraction effect.

SUMMARY

In view of this, the embodiments of the present disclosure provide a control method for a range hood, a range hood, and a computer-readable storage medium.

According to an embodiment of the present disclosure, a control method for a range hood is provided. The range hood includes a fan, and the control method includes: collecting a current operating state parameter of the fan; determining a current air duct parameter based on the current operating state parameter; and controlling operations of the fan based on the current air duct parameter and a predetermined control policy.

According to an embodiment of the present disclosure, a range hood is provided. The range hood includes: one or more processors; a memory; and one or more programs. The one or more programs are stored in the memory and executable by the one or more processors, and the one or more programs include instructions for implementing the control method for the range hood as described above.

According to an embodiment of the present disclosure, a non-volatile computer-readable storage medium is provided. The non-volatile computer-readable storage medium contains computer-executable instructions, which, when executed by one or more processors, cause the one or more processors to implement the control method according to any of the above embodiments.

With the control method for the range hood, the range hood, and the instructions in the computer-readable storage medium, when executed, according to the embodiments of the present disclosure, the range hood determines the current air duct parameter based on the current operating state parameter of the fan, and further controls the operations of the fan based on the current air duct parameter and the predetermined control policy. Therefore, requirements for oil fume extraction in different air duct conditions can be met and improved user experience can be achieved.

Additional embodiments of the present disclosure will be in part set forth below, become apparent in part from the following description, or can be learned by practice of the present disclosure.

BRIEF DESCRIPTION OF DRAWINGS

The above and/or additional embodiments of the present disclosure will become apparent and readily understood from the following description of embodiments, taken in conjunction with the accompanying drawings, in which:

FIG. 4 is a schematic flowchart illustrating a control method according to another embodiment of the present disclosure;

FIG. 5 is a schematic flowchart illustrating a control method according to another embodiment of the present disclosure;

DETAILED DESCRIPTION OF THE DISCLOSURE

Figure 1:
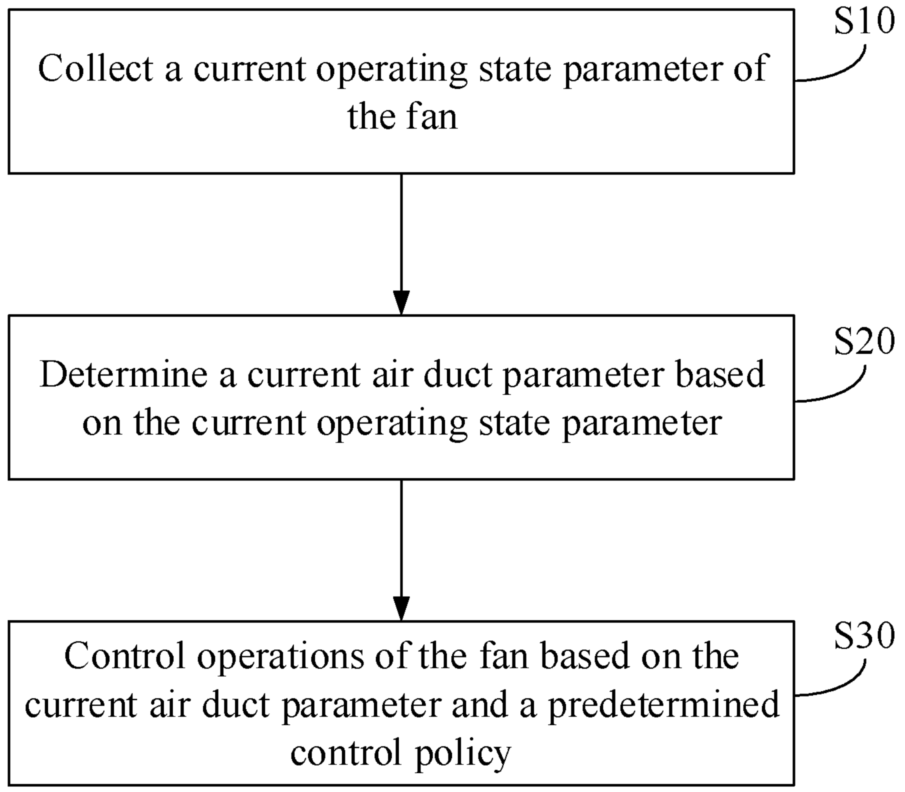
FIG. 1 is a schematic flowchart illustrating a control method according to an embodiment of the present disclosure.

The embodiments of the present disclosure will be described in detail below. Examples of the embodiments are illustrated in the accompanying drawings, throughout which the same or similar reference numerals refer to the same or similar elements or elements having the same or similar functions. The embodiments described below with reference to the accompanying drawings are exemplary, only used to explain the present disclosure, and should not be construed as limitation of the present disclosure.

In the description of the embodiments of the present disclosure, the terms "first" and "second" are only used for description purposes, and cannot be understood as indicating or implying relative importance or implying the number of indicated embodiments. Thus, features defined by "first" and "second" may explicitly or implicitly include one or more of such features. In the description of the embodiments of the present disclosure, the term "plurality" means two or more, unless defined otherwise explicitly and specifically.

In the description of the embodiments of the present disclosure, it is to be noted that, unless specified and defined otherwise explicitly, the terms "installed", "coupled" and "connected" should be interpreted in a broad sense. For example, it may be a fixed connection or a detachable connection, or a one-piece connection. It can be connected directly, or indirectly through an intermediate medium. It can be internal communication between two elements or interaction between the two elements. For those of ordinary skill in the art, the specific meanings of the above terms in the embodiments of the present disclosure can be interpreted depending on specific situations.

The following disclosure provides many different embodiments or examples for implementing different structures of embodiments of the present disclosure. In order to simplify the disclosure of the embodiments of the present disclosure, the components and arrangements of specific examples will be described below. Of course, they are only examples and are not intended to limit the present disclosure. Furthermore, the embodiments of the present disclosure may use repeated reference numerals and/or reference letters in different examples. Such repetition is for the purpose of simplicity and clarity and does not in itself indicate the relation between various embodiments and/or arrangements as discussed. In addition, the embodiments of the present disclosure provide examples of various specific processes and materials, but it can be appreciated by those of ordinary skill in the art that other processes can be applied and/or other materials can be used.

Figures 2, 3:
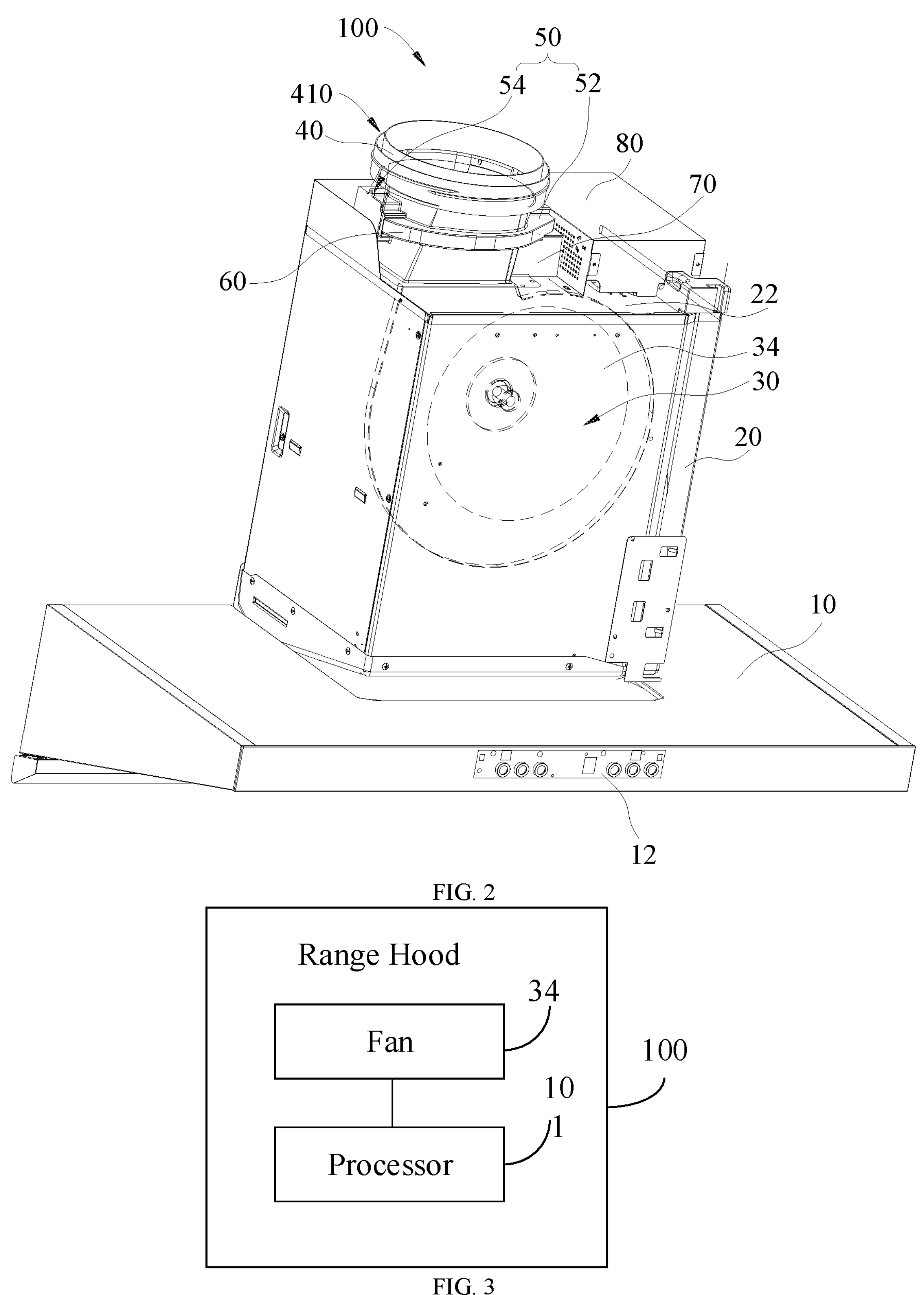
FIG. 2 is a schematic diagram showing a structure of a range hood according to an embodiment of the present disclosure.
FIG. 3 is a schematic diagram showing modules of a range hood according to an embodiment of the present disclosure.

Reference is now made to FIG. 1 and FIG. 2 for a control method of a range hood according to an embodiment of the present disclosure. The range hood includes a fan. The control method includes the following steps:

S10, a current operating state parameter of the fan is collected.

S20, a current air duct parameter is determined based on the current operating state parameter.

S30, operations of the fan is controlled based on the current air duct parameter and a predetermined control policy.

Referring to FIG. 3, a range hood 100 according to an embodiment of the present disclosure includes a fan 34 and a processor 101. The processor 101 is configured to collect a current operating state parameter of the range hood 100, determine a current air duct parameter based on the current operating state parameter, and control operations of the fan 34 based on the current air duct parameter and a predetermined control policy.

That is, the control method according to the embodiment of the present disclosure can be implemented by the range hood 100 according to the embodiment of the present disclosure. In some embodiments, the control method according to the embodiment of the present disclosure may be implemented by the processor 101.

In the control method of the range hood 100 according to the embodiment of the present disclosure, the current air duct parameter can be determined according to the current operating state parameter of the fan 34, and the operations of the fan 34 can be further controlled based on the current air duct parameter and the predetermined control policy. Therefore, requirements for oil fume extraction in different air duct conditions can be met and improved user experience can be achieved.

It can be understood that in the process of using the range hood 100, the oil fume particles are discharged through the air duct. As the oil fumes are extracted, the air duct may be blocked to some degree due to accumulation of the oil fumes. Therefore, the air outlet resistance becomes larger, and the air volume conveyed by the fan 34 is reduced, resulting in a decrease in the power of the fan and in turn a degraded fume extraction effect of the range hood. Therefore, it is necessary to detect the air duct parameter, and to adjust the rotational speed of the fan 34 when necessary to ensure the fume extraction effect.

In this embodiment, the current operating state parameter of the range hood 100 may include an electrical parameter such as an operating current and a rotational speed of the fan 34. Before the range hood 100 leaves the factory, multiple sets of experimental environments with different air resistances can be provided, the electrical parameters and corresponding air duct parameters of the fan 34 operating in each set of experimental environments can be recorded, and the recorded results can be stored.

In actual operation, according to the collected current operating state parameter of the fan 34 or the current electrical parameter, combined with the pre-stored experimental data, the current air duct parameter can be determined by means of data processing, and an air duct blockage state can be further determined based on the current air duct parameter.

The predetermined control policy may be a correspondence between air pressures and air volumes as determined based on operating characteristics of the fan 34, and the operations of the fan 34 may be controlled according to the correspondence. During operation, a user inputs an air volume gear by pressing a key, and the fan 34 starts to operate at a rotational speed corresponding to the gear. The control policy for operating at the gear can be determined based on the rotational speed. During the operations of the fan 34, when the air volume is smaller than the air volume in the control policy, the air volume in the current air duct state can be increased by increasing the rotational speed of the fan, and when the air volume is higher than the air volume value in the control policy, the rotational speed of the fan can be reduced, and the noise of the range hood 100 can be reduced while meeting the requirements for oil fume extraction.

Referring to FIG. 4, in this embodiment, S20 includes:

S21: the current air duct parameter is determined based on the current operating state parameter and a pre-stored correspondence between air duct parameters and electrical parameters.

In some embodiments, the processor 101 may be configured to determine the current air duct parameter based on the current operating state parameter and a pre-stored correspondence between air duct parameters and electrical parameters.

In this way, the current air duct parameter may be calculated based on the collected operating state parameter of the range hood, i.e., a current electrical parameter of the fan, such as a current and a rotational speed of the fan, and the pre-stored air duct parameter to determine the air duct state.

In this embodiment, the current air duct parameter can be determined as follows. Based on the principle of the fan, under the same air resistance condition, for different rotational speeds of the fan, the air volume is positively correlated with the rotational speed of the fan, and the air pressure is positively correlated with the square of the rotational speed of the fan. Before the range hood 100 leaves the factory, the fan is controlled to operate at a constant rotational speed under multiple sets of different air resistance conditions, and the electrical parameters of the fan operation, i.e., the current values, and the corresponding air duct parameters, i.e., the air pressures and air volumes, are recorded. In this way, the current air duct parameter can be determined by means of interpolation based on the corresponding relational expression, the current rotational speed of the fan, and the current experimental data, and to determine the current air resistance condition or the blockage state of the air duct.

Referring to FIG. 5, in this embodiment, S30 includes:

S31: a current air duct blockage state is determined based on the current air duct parameter.

S32: a rotational speed of the fan is increased when the air duct blockage state is a first blockage state.

S33: the rotational speed of the fan is decreased when the air duct blockage state is a second blockage state.

S34: the fan to operate is controlled at a constant rotational speed when the air duct blockage state is a third blockage state.

In some embodiments, the processor 101 may be configured to determine a current air duct blockage state based on the current air duct parameter; and increase a rotational speed of the fan 34 when the air duct blockage state is a first blockage state; decrease the rotational speed of the fan 34 when the air duct blockage state is a second blockage state; or control the fan 34 to operate at a constant rotational speed when the air duct blockage state is a third blockage state.

In this way, the air duct blockage state is divided into three blockage states, and different fan control policies are used for different air duct blockage states. In the case of serious air duct blockage, the rotational speed of the fan can be increased to quickly discharge the oil fumes. In the case of mild air duct blockage, the rotational speed of the fan, as well as noise, can be reduced while ensuring the air extraction effect.

In some embodiments, the air duct blockage state can be determined based on the obtained current air duct parameter as described above. In this embodiment, the air duct has three blockage states. Assuming that the blockage degree is 100% when the air duct is completely blocked, the state having the blockage degree greater than 90% is set as the first blockage state, the state having the blockage degree greater than or equal to 40% and smaller than or equal to 90% is set as the second blockage state, and the state having the blockage degree smaller than 40% is set as the third blockage degree. The blockage degree is also the air resistance condition, which is used as the setting condition before the range hood 100 leaves the factory, and the air duct parameters of the fan 34 under different air resistance conditions are recorded. In this way, the current air duct blockage degree can be derived from the current air duct parameter, and to determine the air duct blockage state. For example, if the current air duct blockage degree is 50% as calculated, it can be determined that it is currently the second blockage state.

In one example, when the user is on a low floor of a high building, or the air duct has not been cleaned for many years, the oil fumes solidify and accumulate in the air duct, causing blockage. Or in some old residential areas, the design of the exhaust pipe may be unreasonable, and thus, the air duct may be blocked. In these cases, it increases the difficulty of oil fume discharge. At this time, the air duct is typically in the first blockage state. In this case, according to the predetermined control policy, the fan can be controlled to greatly increase the rotational speed, which can increase the air volume and air pressure, and force the oil fumes to be extracted out of the room and into the air duct.

In another example, for the fume duct in an average user's home, the blockage degree of the air duct is typically not high, e.g., in the second blockage state. In this case, the rotational speed of the fan can be reduced according to the predetermined control policy, independently of the operation characteristics of the fan, and to reduce the noise while ensuring that the air volume under the same air pressure meets the requirements of the second blockage state.

For the third blockage state, it can be considered to be in the vicinity of a zero air pressure area. At this time, the fan 34 is controlled at a constant rotational speed, which can ensure that the air volume in the third blockage state is stable. In this way, the effects of differences in processors, fans, impellers, and air ducts can be accommodated. It can be appreciated that the same model of range hoods 100 in massive production may have differences in processors, fans, impellers, and air ducts, which will affect the air performance of the air duct. For example, due to a small sampling resistance of the processor, the measured current may be relatively large, the actual rotational speed of the fan corresponding to the control current will be relatively low, and the calculation result of the air volume will be relatively high, or otherwise the calculation result will be relatively low. If the output power of the fan becomes smaller, the actual rotational speed of the fan corresponding to the control current will be relatively low, and the calculation result of the air volume will be relatively large, or otherwise the calculation result will be relatively low. If the weight of the impeller becomes heavier, the actual rotational speed of the fan corresponding to the control current will be relatively low, and the calculation result of the air volume will be relatively large, or otherwise the calculation result will be relatively low. If the air duct is seriously blocked, the actual air volume corresponding to the control current is relatively low, the rotational speed is relatively high, and the calculation result of the air volume will be relatively large, or otherwise the calculation result will be relatively low. Due to the above effects, the system deviation may occur when the fan is controlled. Therefore, the constant rotational speed control is adopted in the third blocking state, which can accommodate the influence of the differences in processors, fans, impellers, and air ducts.

Figures 6, 7:
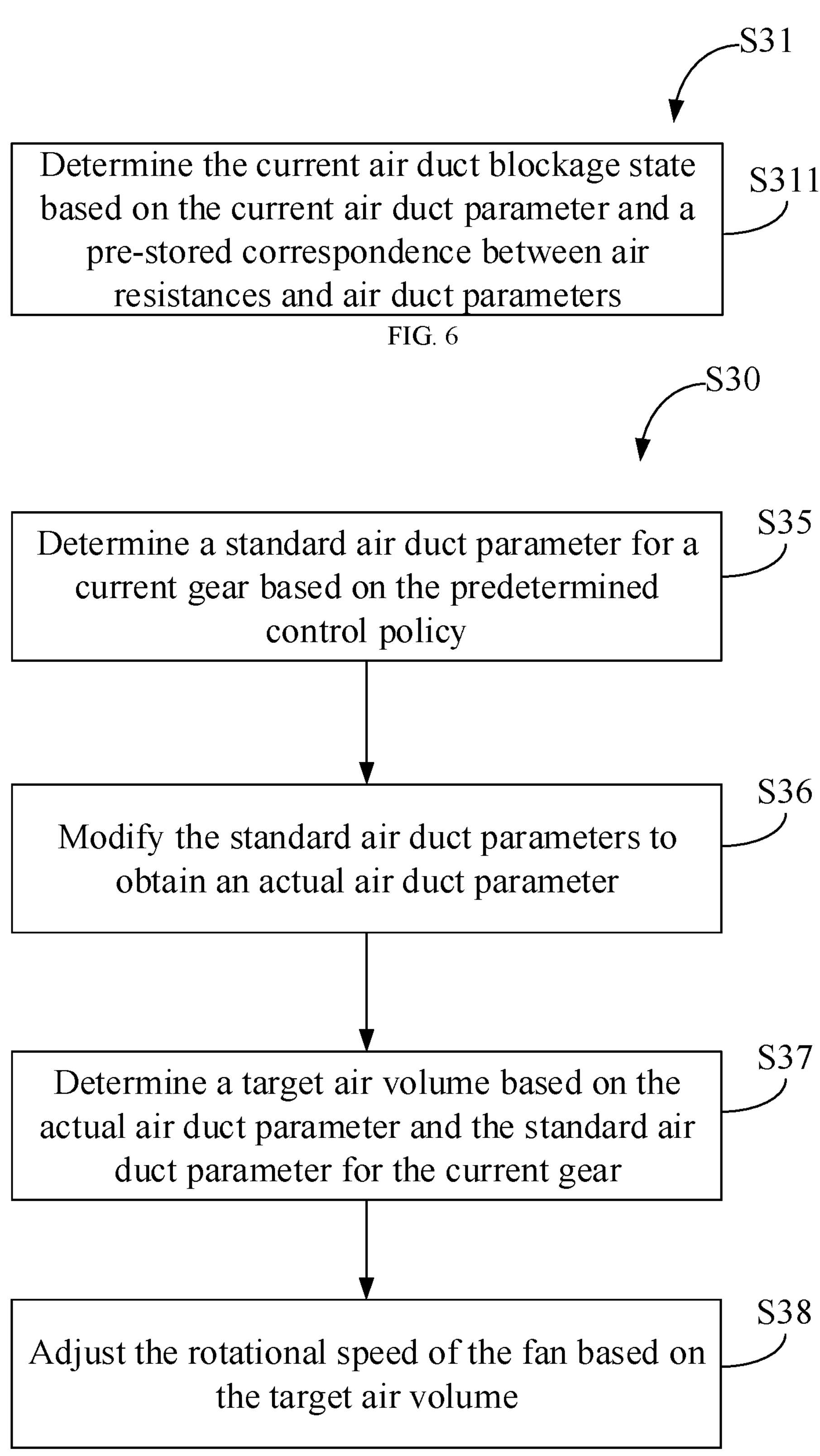
FIG. 6 is a schematic flowchart illustrating a control method according to yet another embodiment of the present disclosure.
FIG. 7 is a schematic flowchart illustrating a control method according to still another embodiment of the present disclosure.

Referring to FIG. 6, in this embodiment, S31 includes:

S311: the current air duct blockage state is determined based on the current air duct parameter and a pre-stored correspondence between air resistances and air duct parameters.

In some embodiments, the processor 101 may be configured to determine the current air duct blockage state based on the current air duct parameter and a pre-stored correspondence between air resistances and air duct parameters.

In this way, the current air duct blockage state can be determined based on the current air duct parameter and the pre-stored correspondence between air resistances and air duct parameters, which provides a control basis for the control policy for the fan.

In some embodiments, before leaving the factory, the range hood 100 operates at a constant rotational speed under multiple sets of different air resistance conditions, and the electrical parameters of the fan operation, i.e., current values, and the corresponding air duct parameters, i.e., air pressures and air volumes are recorded. In this way, the current air duct parameter can be determined by means of interpolation based on the corresponding relational expression, the current rotational speed of the fan, and the current experimental data. In the experimental data, there is a correspondence between air duct parameters and air resistances. The air volume and the air resistance are inversely correlated, and the air pressure and air resistance are positively correlated. The current blockage state of the air duct can be obtained by means of interpolation based on the air pressure or air volume in the current air duct parameter.

Referring to FIG. 7, in this embodiment, S30 further includes:

- S35: a standard air duct parameter for a current gear is determined based on the predetermined control policy;
- S36: the standard air duct parameter is modified to obtain an actual air duct parameter for the gear;
- S37: a target air volume is determined based on the actual air duct parameter and the standard air duct parameter for the current gear; and
- S38: the rotational speed of the fan is adjusted based on the target air volume.

In some embodiments, the processor 101 may be configured to determine a standard air duct parameter for a current gear based on the predetermined control policy; modify the standard air duct parameter to obtain an actual air duct parameter for the gear; determine a target air volume based on the actual air duct parameter and the standard air duct parameter for the current gear; and adjust the rotational speed of the fan based on the target air volume.

In this way, the target quantity of the rotational speed of the fan in the control target is obtained by processing the relevant data. The rotational speed of the fan is changed from the current quantity towards the target quantity, and to realize the adjustment of the air pressure and the air volume, and meet the requirements for oil fume extraction in different air duct blockage states.

In some embodiments, as mentioned above, based on the current air duct parameter, the current air duct blockage state can be determined, and the control direction of the rotational speed of the fan is determined, such as increasing or decreasing the rotational speed. However, in the actual control, it is further necessary to determine the specific control target quantity, such as the target air volume, and to determine the control quantity of the rotational speed of the fan based on the target air volume.

In one example, the pre-stored control policy may include a correspondence between reference air volumes for reference gears and reference air pressures for the reference gears. In this way, according to the proportional relation between air pressures and air volumes, the maximum air volume for the reference gear, and the reference air pressure for the reference gear, and the maximum air volume for the current gear, the standard air pressure for the current gear can be obtained. According to the maximum air volume for the current gear, the reference air volume for the reference gear, and the maximum air volume for the reference gear, the standard air volume for the current gear can be obtained. Accordingly, the standard air duct parameter for the current gear, i.e., the correspondence between the standard air pressure for the current gear and the standard air volume for the current gear, can be obtained. For example, the pre-stored control policy stores the correspondence between air volumes and air pressures with a maximum air volume of 18 $m^3$/min, and the current gear is 15 $m^3$/min, in this case the standard air duct parameter at 15 $m^3$/min can be determined based on the proportional relation.

Further, since the actual air pressure and air volume may deviate from the standard air duct parameter for the current gear, for example, the actual maximum air volume may be 15.1 $m^3$/min or 14.9 $m^3$/min, in this case the standard air duct parameter for the current gear may be modified to obtain the modified actual air duct parameter, and then the target air volume, i.e., the desired air volume value in the current blockage state, can be obtained according to the difference between the modified actual air duct parameter and the standard air volume for the current gear.

Referring to FIG. 7, S38 further includes:

S381: the rotational speed of the fan is increased when the target air volume is lower than a preset threshold.

In some embodiments, when the target air volume is lower than the preset threshold, the rotational speed of the fan is increased.

In some embodiments, it is to be noted that the preset threshold for the target air volume may be different for each fan gear. A proportional value with respect to the maximum air volume can be set, such as 20%. In this way, for a gear of 18 $m^3$/min, 3.6 $m^3$/min may be the preset threshold for the target air volume. It can be appreciated that in the control process, when determining the blockage degree based on the above air duct parameter, it may be possible to determine the second blockage state according to the blockage degree. However, in fact, this determining scheme does not take the actual air volume value into account, but only the relation between the current air duct parameter and the experimental data. If the target air volume is very small, according to the control trend of the rotational speed of the fan in the second blockage state, the rotational speed will be further reduced, which will degrade the effect of oil fume extraction. Therefore, it is necessary to take the actual target air volume value in to account. When the target air volume value is lower than the predetermined threshold value, the rotational speed of the fan can be increased to increase the air volume, and to ensure the effect of oil fume extraction.

According to an embodiment of the present disclosure, a non-volatile computer-readable storage medium is provided. The non-volatile computer-readable storage medium contains computer-executable instructions which, when executed by one or more processors, cause the processor(s) to perform the control method according to any of the above embodiments.

When the instructions in the storage medium according to the embodiment of the present disclosure are executed, the range hood 100 can determine the current air duct parameter based on the current operating state parameter of the fan 34, and further control the operations of the fan 34 based on the current air duct parameter and the predetermined control policy, requirements for oil fume extraction in different air duct conditions can be met and improved user experience can be achieved.

Figure 8:
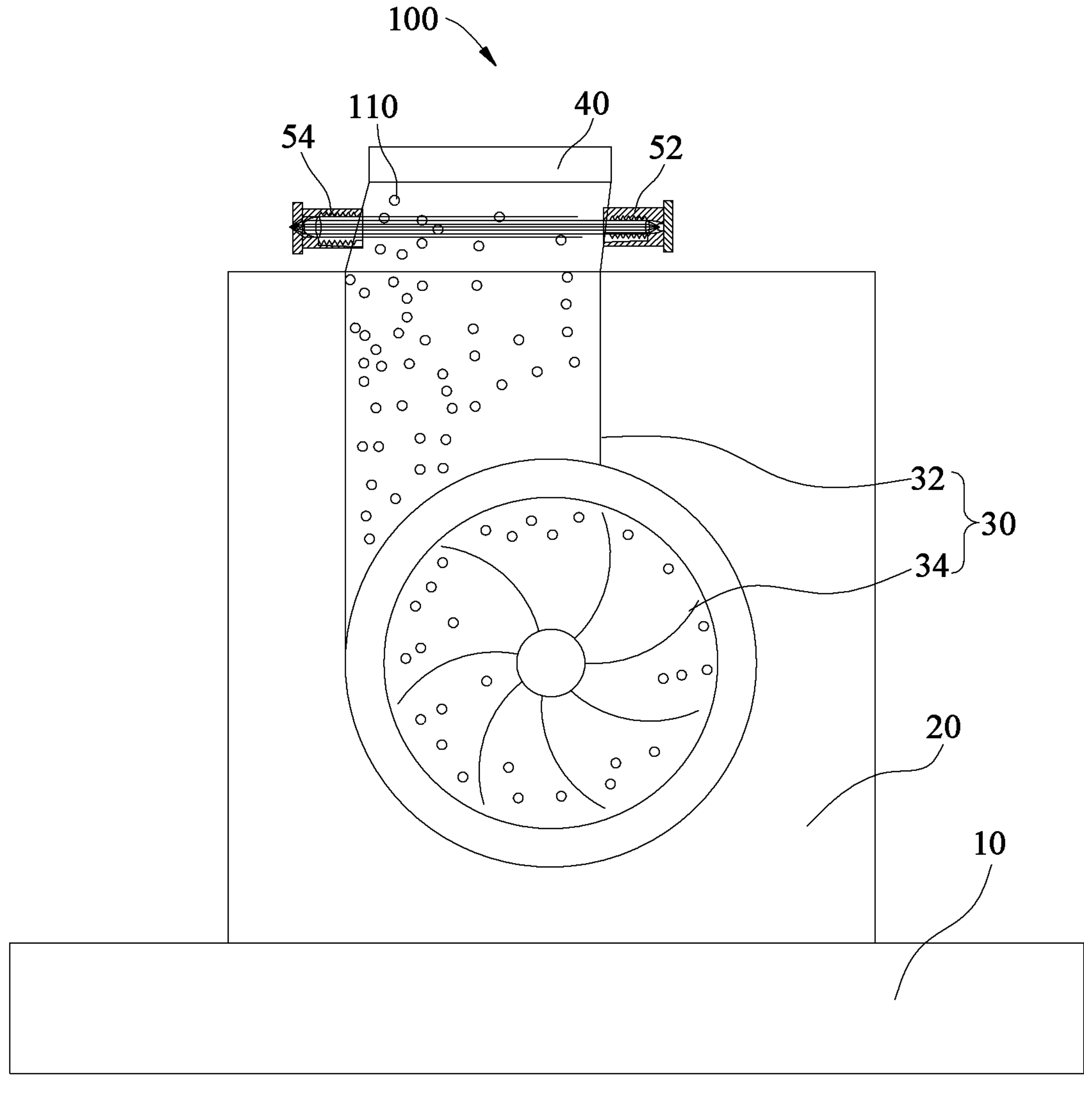
FIG. 8 is schematic diagram showing another structure of a range hood according to the embodiment of the present disclosure.

Referring to FIGS. 2 and 8, FIG. 2 is a schematic diagram showing a structure of a range hood 100 according to an embodiment of the present disclosure. In the example of FIG. 2, the range hood 100 is an up-exhaust range hood 100. It can be appreciated that, in other embodiments, the range hood 100 may be a low-exhaust range hood 100 or a side-exhaust range hood 100, etc., and the present disclosure is not limited to any of these examples. Hereinafter, a detailed description will be given by taking the up-exhaust range hood 100 as an example of the range hood 100. The range hood 100 in the embodiment of the present disclosure may be a frequency-variant range hood.

The range hood 100 according to the embodiment of the present disclosure includes a deflector component 10, a casing 20, and a check valve component 410. The check valve component 410 includes a check valve 40, and the casing 20 is provided on the deflector component 10. The deflector component 10 includes a touch button 12. After the touch button 12 is triggered, the range hood 100 is turned on, and oil fume particles 110 can enter the casing 20 from the deflector component 10. A fan component 30 is provided in the casing 20, and the fan component 30 includes a volute 32 and a fan 34 provided in the volute 32. The oil fume particles 110 enter the volute 32, subject to centrifugal force of the impeller of the fan 34, and the oil fume particles 110 can be discharged from the air outlet duct of the volute 32. The check valve 40 is connected to the top 22 of the casing 20 and is connected to the outlet of the air outlet duct of the volute 32. The oil fume particles 110 may be discharged from the outlet of the air outlet duct of the volute 32 and then discharged into the fume pipe or duct through the check valve 40.

It can be appreciated that the check valve 40 refers to a valve having an opening and closing member which is a circular valve flap and acts by its own weight and medium pressure to block backflow of the medium. The check valve 40 may be a lift check valve or a swing check valve. In this embodiment, the oil fume particles 110 are discharged from the outlet of the air outlet duct of the volute 32 and then enter the check valve 40. When the pressure at the inlet of the check valve 40 is greater than the sum of the weight of the valve flap of the check valve 40 and its rotational resistance, the valve of the check valve 40 is opened. When the oil fume particles 110 flow back, the valve of the check valve 40 is closed.

The range hood 100 according to the embodiment of the present disclosure includes an oil fume detection component 50, which is provided on the check valve 40. In one embodiment, the oil fume detection component 50 may be provided on the outer wall of the check valve 40. In another embodiment, the oil fume detection component 50 may be provided on the inner wall of the check valve 40. In an embodiment of the present disclosure, the oil fume detection component 50 is provided on the outer wall of the check valve 40. Of course, in other embodiments, the oil fume detection component 50 may also be provided in the air outlet duct of the volute 32, and the oil fume detection component 50 may also be provided in the air outlet duct of the volute 32 and the check valve 40.

In some embodiments, the oil fume detection component 50 may be an infrared detection component or a laser detection component, or includes an organic molecule sensor, etc. The present disclosure is not limited to any of these examples. The following embodiments are described in detail with reference to an example where the oil fume detection component 50 is an infrared detection component.

The oil fume detection component 50 includes a light emitting device 52 and a light receiving device 54. The light emitting device 52 is configured to emit light to the oil fume air duct of the check valve 40, and the light receiving device 54 is configured to receive the light emitted by the light emitting device 52 and output an electrical signal based on the received light. Generally, the particle size of the oil fume particles 110 ranges from 100 nm to 10 um. In an embodiment, when the oil fume particles 110 pass through the optical path of the infrared light emitted by the light emitting device 52, the infrared light can be shielded, scattered and diffracted. That is, the oil fume particles 110 in the check valve 40 will affect the intensity of the light emitted by the light emitting device 52 as received by the light-receiving device 54, and change the electrical signal outputted by the light receiving device 54. The range hood 100 can control the operations of the fan 34 based on the electrical signal. Therefore the fan 34 can provide suitable air volume to extract the oil fume particles 110. The effect of extracting the oil fume particles 110 is good with high accuracy. In addition, the orientation of the light receiving device 54 is configured on the side to which the air outlet of the volute is deviated, e.g., the left side shown in FIG. 8. In some embodiments, the controlling of the operations of the fan 34 can be understood as controlling the air volume of the fan 34, and the air volume of the fan 34 depends on the rotational speed of the fan 34. In one example, the correspondence between oil fume concentrations and air volumes of the fan can be established by simulating the actual use of the range hood 100, and the oil fume concentration can be calibrated based on the electrical signal outputted by the light receiving device 54. By adjusting the rotational speed of the fan 34 to achieve a corresponding air volume, the effect of oil fume extraction can be improved.

The oil fume detection component may include one or more light receiving devices, and the light intensity signal outputted by each light receiving device can be used as an oil fume concentration. In this way, in the case where the oil fume detection component includes one light receiving device, the air volume of the fan 34 can be determined based on one detected oil fume concentration. In the case where the oil fume detection component includes light receiving devices, the air volume of the fan 34 is determined based on detected oil fume concentrations, the average value of oil fume concentrations can be used as the basis of oil fume concentration for controlling the air volume of the fan 34, or oil fume concentrations can be weighted and calculated as the basis of the oil fume concentration for controlling the air volume of the fan 34. The present disclosure is not limited to any specific scheme of controlling the air volume of the fan based on the oil fume concentration.

Figure 9:
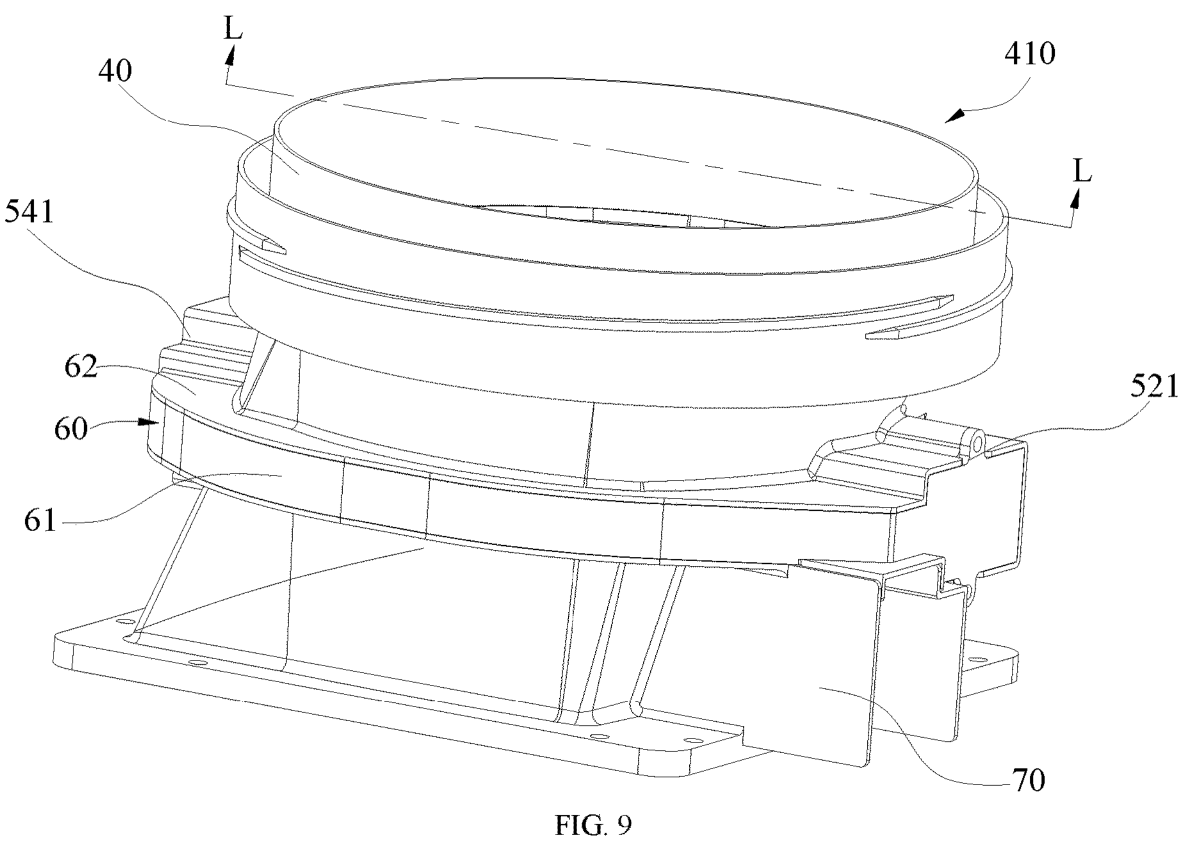
FIG. 9 is a schematic diagram showing a structure of a check valve component in a range hood according to an embodiment of the present disclosure.

Referring to FIG. 9, in the example of FIG. 9, the range hood 100 further includes fixing parts provided and spaced apart on the outer wall of the check valve 40, and the light emitting device 52 and the light receiving device 54 can be installed on the fixing parts at intervals. In some embodiments, the fixing parts may include a first fixing part 521 and a second fixing part 541 that are spaced apart, the light emitting device 52 can be installed on the first fixing part 521, and the light receiving device 54 is installed on the second fixing part 541.

In the embodiment shown in FIG. 9, the fixing parts and the check valve 40 are a one-piece structure, that is, the first fixing part 521, the second fixing part 541, and the check valve 40 are a one-piece structure. In this way, the manufacturing of the fixing parts and the check valve 40 can be simplified.

In another embodiment, the fixing parts and the check valve 40 are separate structures, that is, the first fixing part 521, the second fixing part 541, and the check valve 40 are separate structures. In this way, the oil fume detection component 50 can be applied to different types of check valves 40, and with the original oil fume detection component 50 and other components, the retrofit cost of the check valve 40 can be reduced and the efficiency can be improved. In some embodiments, the first fixing part 521 and the second fixing part 541 may be connected with the check valve 40 by means of screw, snap, or glue.

It is to be noted that, the first fixing part 521 and the second fixing part 541 may be configured as a one-piece structure or separate structures, depending on actual requirements of the range hood 100, and the present disclosure is not limited to any of these examples.

In the examples of FIGS. 2 and 9, the range hood 100 includes a wire protection structure 60 provided on the outer wall of the check valve 40. The oil fume detection component 50 includes wires (not shown) connected to the light emitting device 52 and the light receiving device 54, and a part of the wires is received in the wire protection structure 60. In this way, the wire protection structure 60 can protect the wires to increase the lifetime of the oil fume detection component 50.

In some embodiments, the wire protection structure 60 are connected to the first fixing part 521 and the second fixing part 541, and the wires can be used for power supply and transmission of data and instructions. The wires include a first wire connected to the light emitting device 52 and a second wire connected to the light receiving device 54. The wire protection structure 60 includes a wire protection cavity 62 and a wire protection cover 61, a part of the first wire and a part of the second wire are received in the wire protection groove provided in the wire protection cavity 62, and the wire protection cover 61 covers the wire protection groove to form a relatively confined space. Two ends of the wire protection cover 61 can be connected to the first fixing part 521 and the second fixing part 541 by means of clamping, screwing, or the like, respectively. In addition, wires can be formed into a wire bundle, which facilitates the arrangement of the wires.

In an embodiment, the first fixing part 521, the second fixing part 541, and the wire protection cavity 62 can be formed as a one-piece structure with the check valve 40.

In another embodiment, the first fixing part 521, the second fixing part 541, and the wire protection cavity 62 can be separate structures. In some embodiments, the wire protection structure 60 can be connected to the first fixing part 521 and the second fixing part 541 to form a one-piece part which can be connected to the check valve 40 by means of screw, snap, or glue.

Figure 10:
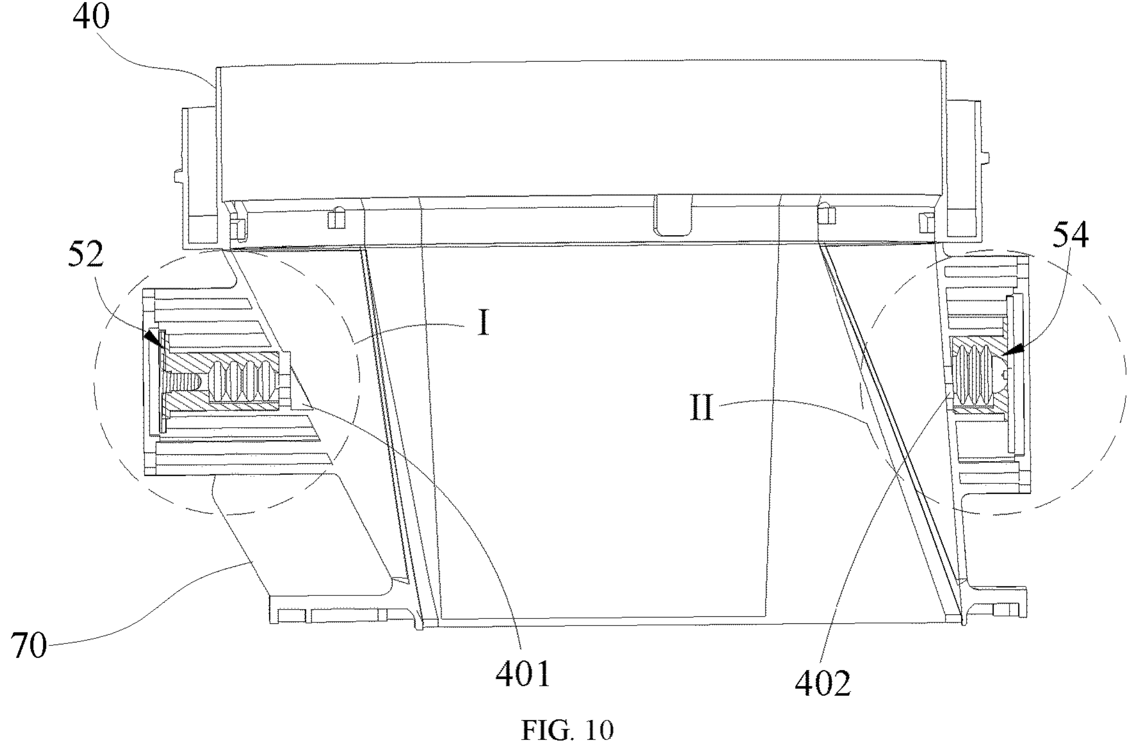
FIG. 10 is a planar cross-sectional view of the check valve component in FIG. 9 along the L-L direction.
Figure 11:
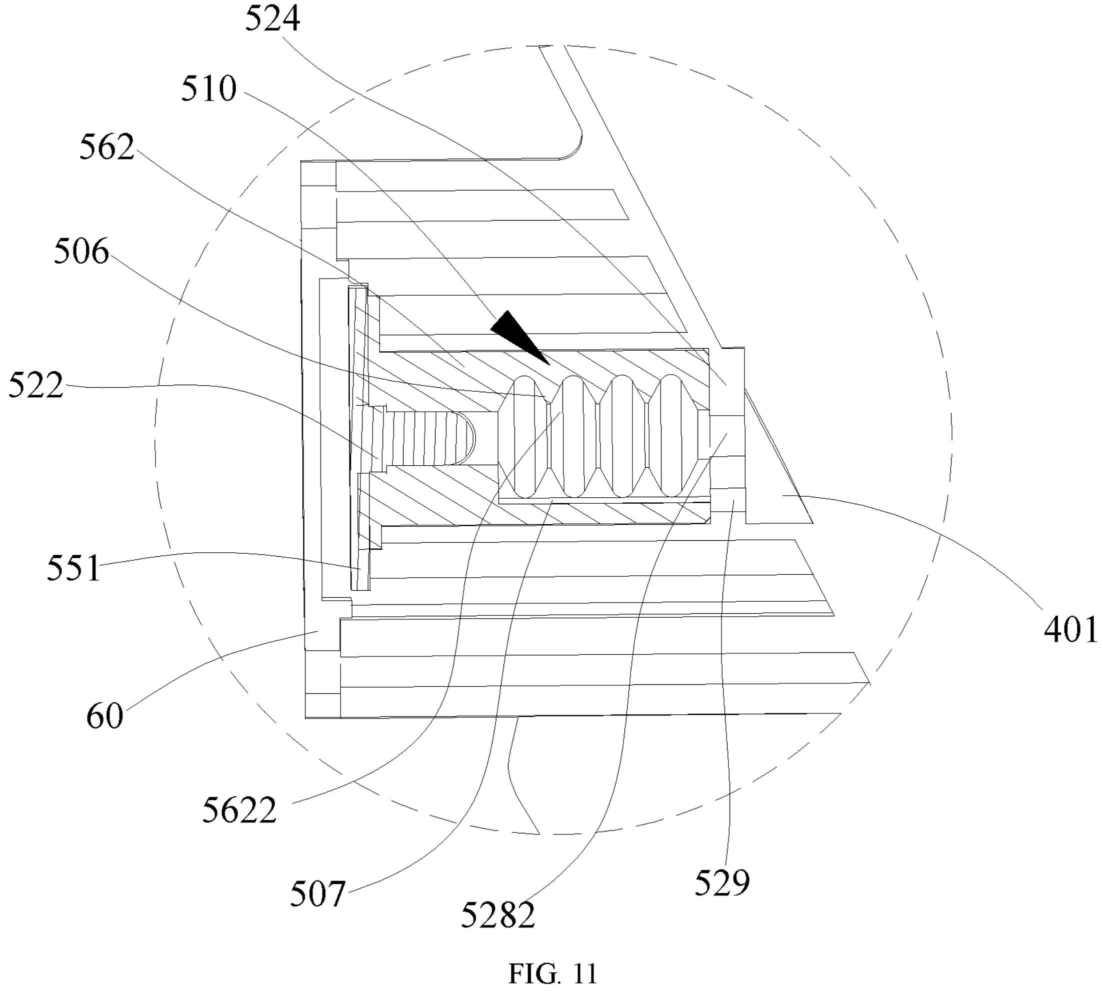
FIG. 11 is an enlarged view of Part I in FIG. 10.
Figure 12:
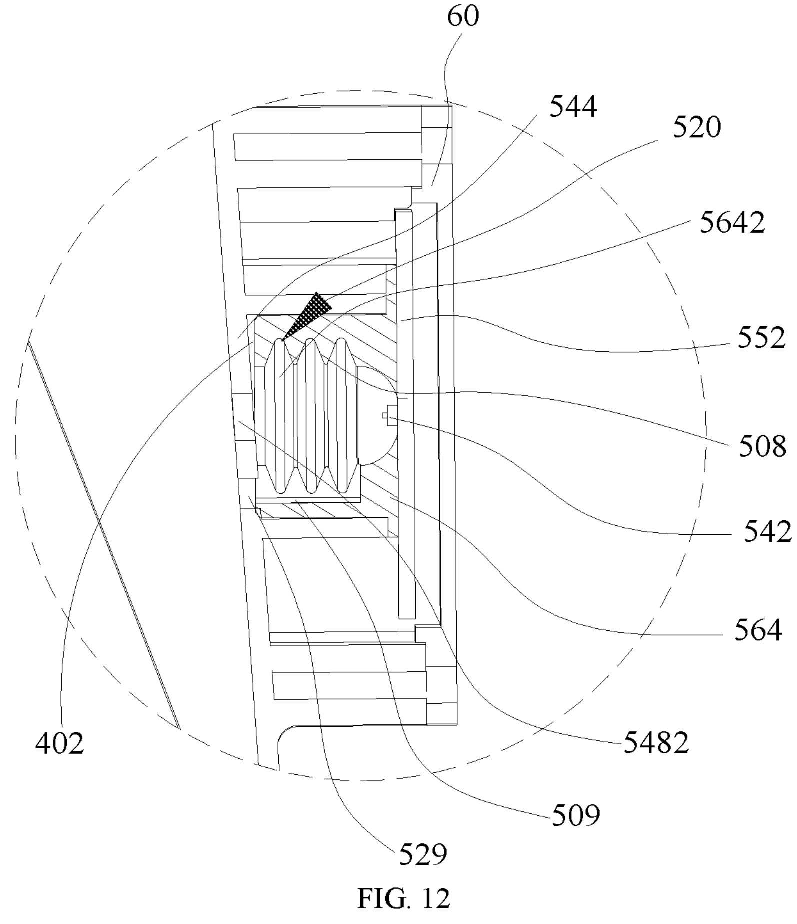
FIG. 12 is an enlarged view of Part II in FIG. 10.

In an embodiment of the present disclosure, referring to FIG. 9 and FIG. 10, FIG. 10 is a cross-sectional view of the check valve component of FIG. 9 along the L-L line, and the perspective of the cross-sectional view shown in FIG. 10 is a planar cross-sectional view. The light emitting device 52 and the light receiving device 54 each include a sealing plug and a circuit board. Referring to FIGS. 11 and 12, the sealing plug of the light emitting device 52 is the first sealing plug 562, and the sealing plug of the light receiving device 54 is the second sealing plug 564. The circuit board of the light emitting device 52 is the first circuit board 551, and the circuit board of the light receiving device 54 is the second circuit board 552. The first sealing plug 562 is mounted on the first circuit board 551, and the second sealing plug 564 is mounted on the second circuit board 552. The light emitting device 52 further includes a light emitting part 522, the first sealing plug 562 has a first inner cavity 5622, and the light emitting part 522 is placed in the first inner cavity 5622 and provided on the first circuit board 551. The light receiving device 54 further includes a light receiving part 542, the second sealing plug 564 has a second inner cavity 5642, and the light receiving part 542 is placed in the second inner cavity 5642 and provided on the second circuit board 552.

After the first sealing plug 562 and the first circuit board 551 are matched and pressed together, the first inner cavity 5622 with one end open is formed. After the second sealing plug 564 and the second circuit board 552 are matched and pressed together, the second inner cavity 5642 with one end open is formed. The material of each sealing plug can be a soft material such as rubber or silicone gel. In an example, the ratio of the depth to the aperture size of the inner cavity is greater than or equal to 6, and the ratio of the oil fume particles 110 diffusing into the aperture can be controlled to be smaller than 1%.

Referring to FIGS. 10, 11, and 12, the check valve 40 may have a first through hole 401, and the first sealing plug 562 may be partially provided within the first through hole 401. The check valve 40 may have a second through hole 402, and the second sealing plug 564 may be partially provided within the second through hole 402.

Referring to FIG. 11, the check valve 40 may further include a first convex ring 524 protruding from the inner wall of the first through hole 401. The first convex ring 524 has the effect of blocking the oil fume particles 110 from entering the first inner cavity 5622. The first convex ring 424 has an emission opening 5282 which facilitates exit of light. The check valve 40 may include a second convex ring 544 protruding from the inner wall of the second through hole 402. The second convex ring 544 has a receiving opening 5482 which facilitates entry of light. The second convex ring 544 has the effect of blocking the oil fume particles 110 from entering the second inner cavity 5642.

The light emitting part 522 includes an infrared emitting tube. The light receiving part 542 includes an infrared receiving tube. The light emitting part 522 can emit infrared light, and the light receiving part 542 can receive the infrared light emitted by the light emitting part 522, and output a corresponding electrical signal based on the received infrared light, and the corresponding electrical signal can be transmitted through the second circuit board 552 to the controller of the electronic control board.

Figure 13:
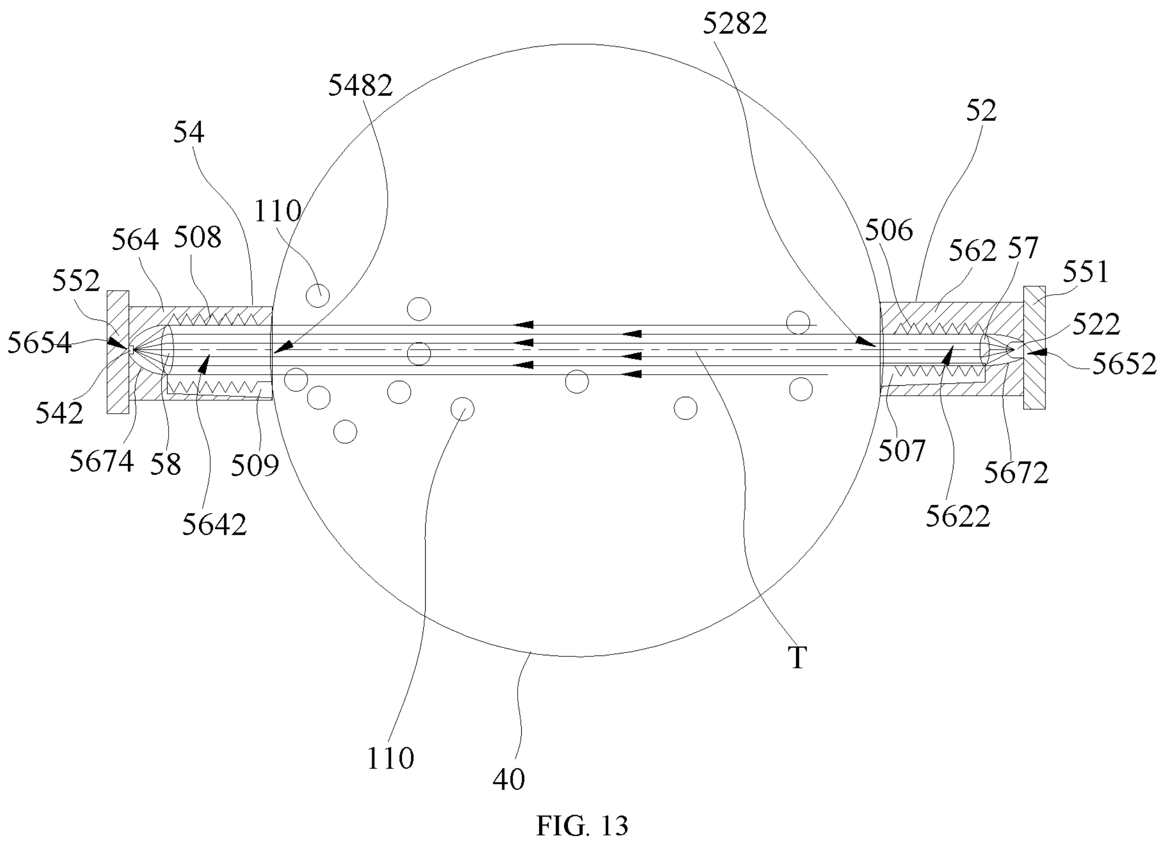
FIG. 13 is a schematic diagram showing a structure of an oil fume detection component according to an embodiment of the present disclosure.

In the example of FIG. 11, a first shielding part 510 may be provided on the inner wall of the first inner cavity 5622, at the front end of the light emitting part 522. In some embodiments, the first shielding part 510 has one or more first oil baffle rings 506, which are annularly protruded on the inner wall of the first inner cavity 5622. There may be first oil baffle rings 506 arranged along the length direction of the first sealing plug. In the example of FIG. 13, a second shielding part 520 may be provided on the inner wall of the second inner cavity 5642, located at the front end of the light receiving part 542. In some embodiments, the second shielding part 520 has one or more second oil baffle rings 508, which are annularly protruded on the inner wall of the second inner cavity 5642. There may be second oil baffle rings 508 arranged along the length direction of the second sealing plug.

When the oil fume particles enter the first inner cavity 5622 due to air fluctuations, the oil fume particles 110 will be shielded by the first shielding part 510 attached to the first inner cavity 5622 to reduce pollution for the light emitting part 522. For the first oil baffle ring 506, the groove of the first oil baffle ring 506 absorbs air fluctuations, and the oil fume particles 110 are further shielded by the first oil baffle ring 506. Therefore, the first oil baffle ring 506 can further improve the shielding of the oil fume particles 110, further prevent the oil fume particles 110 from polluting the light emitting part 522 and affecting the lifetime of the light emitting part 522.

When the oil fume particles 110 enter the second inner cavity 5642 due to air fluctuations, the oil fume particles 110 will be shielded by the second shielding part 520 attached to the second inner cavity 5642 to reduce pollution for the light receiving portion 542. For the second oil baffle ring 508, the groove of the second oil baffle ring 508 absorbs air fluctuations, and the oil fume particles 110 are further shielded by the second oil deflector 508. Therefore, the second oil deflector 508 can further improve the shielding of the oil fume particles 110, further prevent the oil fume particles 110 from polluting the light receiving part 542 and affecting the lifetime of the light receiving part 542.

It is to be noted that, in other embodiments, the first shielding part 510 may include other shielding structures, for example, structures such as bumps, ridges, and depressions on the inner wall of the first inner cavity 5622. The provision of the first shielding part 510 increases the area of the inner wall of the first inner cavity 5622 to increase the probability of the oil fume particles being attached. The second shielding part 520 may include other shielding structures, for example, structures such as bumps, ridges, and depressions on the inner wall of the second cavity 5642. The provision of the second shielding part 520 increases the area of the inner wall of the second inner cavity 5642 to increase the probability of the oil fume particles being attached.

Figure 14:
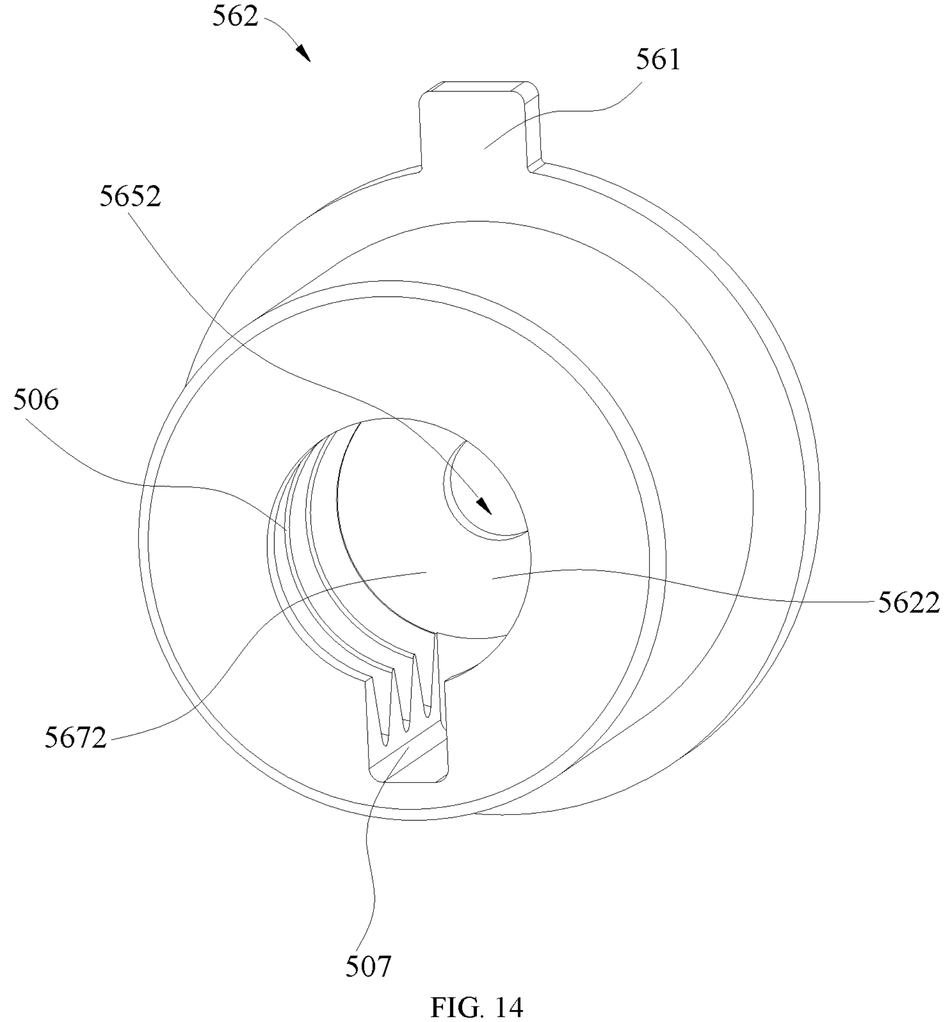
FIG. 14 is a schematic diagram showing a structure of a sealing plug according to an embodiment of the present disclosure.

In the examples of FIGS. 11, 12, and 14, the inner wall of the first inner cavity 5622 has a first oil guide groove 507, which is connected to the first shielding part 510. When the oil fume particles 110 enter the first inner cavity 5622 due to air fluctuations, the oil fume particles 110 will be attached to the inner wall of the first inner cavity 5622 to form condensation, which can flow out via the first oil guide groove 507 at the bottom of the first sealing plug 562. The first oil guide groove 507 is an elongated hole with a circular or square cross-section. The opening of the first oil guide groove 507 may be lower than the interior of the first inner cavity 5622, that is, the first oil guide groove 507 is inclined downward in the direction away from the light emitting portion 522 to facilitate the outflow of the liquid. In one embodiment, the opening of the first oil guide groove 507 may be parallel to the first inner cavity 5622 to allow the liquid to flow out by itself. The side length or diameter of the first oil guide groove 507 needs to be greater than or equal to 2.5 mm (or, greater than or equal to 3 mm) to overcome the internal tension of the liquid and facilitate the outflow of the liquid.

In one example, the first sealing plug 562 is cylindrical, and has an outer diameter of 20 to 25 mm and an inner diameter of 5 to 10 mm. The depth of the first oil baffle ring 506 is 5 to 10 mm, and the depth of the first oil guide groove 507 is 3 to 5 mm. The first oil baffle ring 506 is annular. There may be the first oil baffle rings 506, and the first oil baffle rings 506 are arranged in sequence along the length direction of the first sealing plug 562. Each of the first oil baffle rings 506 has the same depth. It is to be noted that the numerical values and numerical ranges mentioned in the above examples and embodiments are for illustrating the implementation of the present disclosure, and should not be construed as limitations of the present disclosure. The above numerical values and numerical ranges can be adjusted according to actual design parameters. Numerical values and numerical ranges mentioned elsewhere herein are to be construed based on the corresponding descriptions. In other examples, the first sealing plug 562 may alternatively have a regular shape such as a rectangular parallelepiped, a cube, etc. or an irregular shape, and the present disclosure is not limited to any of these examples.

In the example of FIG. 12, each of the first convex ring 524 and the second convex ring 544 has a drain hole 529, which communicates with the corresponding oil guide groove. The dirt flowing into the oil guide groove can be discharged out of the first sealing plug 562 or the second sealing plug 564 via the drain hole 529.

In the example of FIG. 12, the inner wall of the second inner cavity 5642 has a second oil guide groove 509, which is connected to the second shielding part 520. When the oil fume particles 110 enter the second inner cavity 5642 due to air fluctuations, the oil fume particles 110 will be attached to the inner wall of the second inner cavity 5642 to form condensation, which can flow out via the second oil guide groove 509 at the bottom of the second sealing plug 564. The second oil guide groove 509 is an elongated hole with a circular or square cross-section. The opening of the second oil guide groove 509 may be lower than the interior of the second inner cavity 5642, that is, the second oil guide groove 509 is inclined downward in the direction away from the light receiving portion 542 to facilitate the outflow of the liquid. In one embodiment, the opening of the second oil guide groove 509 may be parallel to the second inner cavity 5642 to allow the liquid to flow out by itself. The side length or diameter of the second oil guide groove 509 needs to be greater than or equal to 2.5 mm (or, greater than or equal to 3 mm) to overcome the internal tension of the liquid and facilitate the outflow of the liquid.

Referring to FIG. 13, in the example of FIG. 13, the central axis of the light emitting device 52 and the central axis of the light receiving device 54 are located on the same straight line T, and intersect with the central axis of the check valve 40 in the vertical direction (this central axis is perpendicular to the paper). In this way, the oil fume detection component 50 can be installed. The central axis of the first inner cavity 5622, the central axis of the second inner cavity 5642, the central axis of the light emitting device 52, and the central axis of the light receiving device 54 are coincident, and are located on the same straight line T. In another embodiment, the central axis of the light emitting device 52 and the central axis of the light receiving device 54 may be located on different straight lines, and intersect with the central axis of the check valve 40 in the vertical direction (this central axis is perpendicular to the paper). The included angle formed by intersection of the central axis of the light emitting device 52 and the central axis of the light receiving device 54 is in the range of (0, 180) degrees, for example, 30 degrees, 40 degrees, or 120 degrees.

Further, one end of the first sealing plug 562 has an emission opening 5282, and the second sealing plug 564 has a receiving opening 5482. The diameter of the receiving opening 5482 is larger than that of the emission opening 5282. In this way, the area of the light receiving region of the light receiving device 54 can be increased.

In the example of FIG. 13, the central axis of the light emitting device 52 and the central axis of the light receiving device 54 are located on the same straight line T on a plane perpendicular to the central axis of the check valve, and the light emitting device 52 and the light receiving device 54 are arranged on the left and right sides of the check valve 40, respectively. The central axis of the check valve 40 in the vertical direction in FIG. 13 is perpendicular to the paper.

In another embodiment, the central axis of the light emitting device 52 and the central axis of the light receiving device 54 are located on the same straight line inclined with respect to a plane perpendicular to the central axis of the check valve 40. For example, the central axis of the light emitting device 52 and the central axis of the light receiving device 54 may be located on the same straight line inclined by 10 degrees, 20 degrees, or 30 degrees with respect to the plane perpendicular to the central axis of the check valve 40, and the present disclosure is not limited to any specific inclination angle.

The light receiving device 54 and the light emitting device 52 shown in FIG. 13 are arranged on the left and right sides of the check valve 40, respectively, and can be rotated horizontally at any angle at the installation position shown in the figure. For example, they can be arranged on the front and rear sides of the check valve 40 or at other positions. The light emitting device 52 can emit light (such as infrared light), which passes through the oil fume air duct area of the check valve 40 and is received by the opposite light receiving device 54. When there are no particles in the air duct area, the light receiving device 54 detects the light at a substantially unchanged intensity, i.e., the value of the output electrical signal (such as the voltage value) is substantially unchanged.

The oil fume particles, subject to the centrifugal force of the impeller, reach the oil fume air duct of the check valve 40 through the volute 32. The oil fume particles 110 pass through the light path, causing shielding, scattering and diffraction of light. The shielding by large-size particles has a greater impact on the light intensity, causing the received light intensity at the light receiving device 54 to decrease. When the oil fumes are reduced, the shielding effect decreases, and the intensity of the light received by the light receiving device 54 is increased. The light intensity can be represented by the value of the electrical signal. For example, the light receiving device 54 receives light and outputs an electrical signal, the electrical signal is converted into a digital signal after analog-to-digital conversion, and a corresponding value, such as a voltage value, can be obtained from the digital signal.

In the example of FIG. 14, the first sealing plug 562 further includes a fixing pin 561. The sealing plug 56 can be accurately installed on the first fixing part 521 through the fixing function of the fixing pin 561. The planar shape of the fixing pin 561 may be rectangular, circular, triangular, etc., and the present disclosure is not limited to any of these examples. In the example of FIG. 14, the planar shape of the fixing pin 561 is rectangular. The second sealing plug 564 may have a similar structure as the first sealing plug 562.

Figure 15:
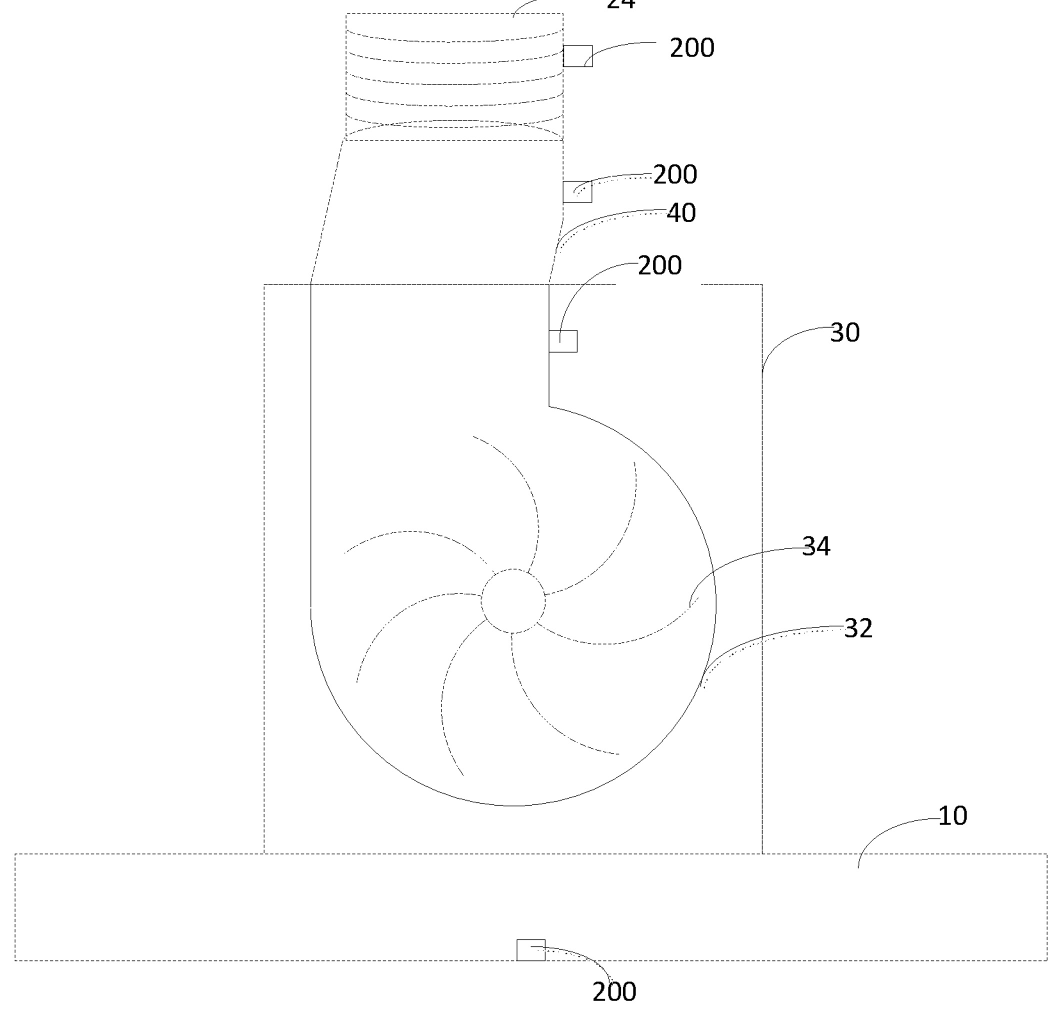
FIG. 15 is a schematic diagram showing a structure of a range hood according to another embodiment of the present disclosure.

FIG. 15 shows a range hood 100 according to another embodiment of the present disclosure. The range hood 100 may include a deflector component 10, a casing 20, a check valve 40, and an organic molecule sensor 200. The casing 20 is provided on the deflector component 10, a fan component 30 is provided within the casing 20, and a check valve 40 is connected to the top of the casing 20 and is connected to a fume pipe 24. The fan component 30 includes a volute 32 and a fan 34 provided in the volute 32. The deflector component 10 has a fume collecting cavity (not shown), and the organic molecule sensor 200 is installed on at least one of the fume collecting cavity, the volute 32, the check valve 40, and the fume pipe 24. The organic molecule sensor 200 is configured to detect a concentration of organic molecules in the oil fume air duct within at least one of the fume collecting cavity, the volute 32, the check valve 40, and the fume pipe 24. The range hood 100 is configured to control the operations of the fan 34 based on the concentration of the organic molecules.

The range hood 100 in this embodiment is suitable to be installed on a stove in a family kitchen, and is also suitable for a large kitchen in a restaurant. In one example, when a user is cooking on the kitchen stove, oil fumes will be generated during the cooking process, and the oil fumes contain a large number of organic molecules and oil fume particles. Typically, the concentration of the organic molecules is proportional to the concentration of the oil fumes. Thus, the concentration of oil fumes can be determined by detecting the concentration of organic molecules. The organic molecule sensor 200 installed on the range hood 100 can detect the concentration of organic molecules contained in the oil fumes to learn the current concentration of oil fume particles in the kitchen, and adjust the rotational speed of the fan 34 of the fan component 30 based on the current concentration of the organic molecules contained in the oil fumes. In this way, the concentration of the oil fumes in the kitchen can be effectively purified in real time to protect human health. Additionally, when the concentration of the oil fumes is relatively low, the power of the fan component 30 can be appropriately reduced to save energy.

In the range hood of the above embodiment, the organic molecule sensor 200 is utilized to detect the concentration of the organic molecules, and to determine the concentration of the oil fumes, and the operations of the fan 34 can be controlled based on the concentration of the organic molecules. Therefore the fan 34 can provide a suitable air volume to extract the oil fume particles. The effect of extracting the oil fume particles is good with high accuracy.

In some embodiments, the organic molecule sensor 200 may use a Volatile Organic Compound (VOC) sensor. In the embodiment shown in FIG. 15, the organic molecular sensor 200*s* are installed in the fume collecting cavity, the volute 32, the check valve 40, and the fume pipe 24. Therefore, the organic molecular sensors can detect the concentration of organic molecules in the oil fume air duct within the fume collecting cavity, the volute 32, the check valve 40, and the fume pipe 4, and the average value of the concentrations of organic molecules collected by the four organic molecule sensors 200 can be calculated and used as the basis for controlling the operations of the fan 34. It can be appreciated that, in other embodiments, the data collected by the four organic matter molecule sensors 200 can further be provided with different weights to calculate the data that is finally used to control the operations of the fan 34. In other embodiments, the organic molecular sensor(s) 200 may be installed on one or two or three of the fume collecting cavity, the volute 32, the check valve 40, and the fume pipe 24.

The range hood 100 may be provisioned with a correspondence between oil fume concentrations and air volumes of the fan, and the correspondence may be set by simulating actual usage scenarios of the range hood 100. The correspondence between oil fume concentrations and resistance values outputted by the organic molecule sensor 200 or light intensity signals outputted by the light receiving device 54 can also be calibrated and saved during the simulation process.

In the present disclosure, the description with reference to the terms "an embodiment", "some embodiments", "illustrative embodiment", "an example", "a specific example", or "some examples", etc., means that specific features, structures, materials, or characteristics described in conjunction with the embodiment(s) or example(s) are included in at least one embodiment or example of the present disclosure. In the present disclosure, any illustrative description of the above terms does not necessarily refer to the same embodiment(s) or example(s). The specific features, structures, materials or characteristics as described can be combined in any one or more embodiments or examples as appropriate.

Any process or method described in the flowchart or described otherwise herein can be understood as a module, segment or part of codes that include one or more executable instructions for implementing steps of specific logical functions or processes. It can be appreciated by those skilled in the art that the scope of the embodiments of the present disclosure includes additional implementations where functions may not be performed in the order as shown or discussed, including implementations where the involved functions are performed substantially in parallel or even in a reverse order.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processing module, or any other system that can retrieve and execute instructions from an instruction execution system, apparatus, or device). For the specification, a "computer-readable medium" can be any apparatus that can contain, store, communicate, propagate, or transmit a program to be used by or used with an instruction execution system, apparatus, or device. More specific examples of computer-readable mediums include, as a non-exhaustive list: an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then stored in a computer memory.

It can be appreciated that each part of the present disclosure can be implemented in hardware, software, firmware or any combination thereof. In the above embodiments, steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

It can be appreciated by those skilled in the art that all or some of the steps in the methods of the above embodiments can be implemented by relevant hardware following instructions of a program. The program can be stored in a computer-readable storage medium, and the program, when executed, implements any one or combination of the steps of the method embodiments.

In addition, the functional units in various embodiments of the present disclosure may be integrated into one processing module, or each unit may be standalone physically, or two or more units may be integrated into one module. The above integrated module can be implemented in a form of hardware or in a form of a software function module. When implemented in the form of the software function module and sold or used as an independent product, the integrated module can also be stored in a computer-readable storage medium.

The storage medium mentioned above may be a read only memory, a magnetic disk or an optical disc, etc.

Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. A control method for a range hood, wherein the range hood comprises a fan, and the control method comprises:

collecting a current operating state parameter of the fan;

determining a current air duct parameter based on the current operating state parameter; and controlling operations of the fan based on the current air duct parameter and a predetermined control policy, comprising:

determining a current air duct blockage state based on the current air duct parameter;

increasing a rotational speed of the fan in accordance with a determination that the current air duct blockage state is a first blockage state;

decreasing the rotational speed of the fan in accordance with a determination that the current air duct blockage state is a second blockage state; and controlling the fan to operate at a constant rotational speed in accordance with a determination that the current air duct blockage state is a third blockage state, the third blockage state being a zero air pressure state;

wherein said controlling the operation of the fan based on current air duct parameters and the predetermined control policy comprises:

determining a standard air duct parameter for a current gear based on the predetermined control policy;

modifying the standard air duct parameter to obtain an actual air duct parameter;

determining a target air volume based on the actual air duct parameter and the standard air duct parameter for the current gear; and adjusting the rotational speed of the fan based on the target air volume;

wherein the standard air duct parameter comprises an air pressure and an air volume of the range hood, wherein the range hood comprises an oil fume detection component disposed on an outer wall of a check valve, wherein controlling operations of the fan based on the current air duct parameter and a predetermined control policy comprises:

controlling the rotational speed of the fan based on an oil fume concentration detected by the oil fume detection component.

2. The control method according to claim 1, wherein the current operating state parameter comprises a current electrical parameter of the fan.

3. The control method according to claim 1, wherein the predetermined control policy comprises a correspondence between air pressures and air volumes as determined based on operating characteristics of the fan.

4. The control method according to claim 1, wherein said determining the current air duct parameter based on the current operating state parameter comprises:

determining the current air duct parameter based on the current operating state parameter and a pre-stored correspondence between air duct parameters and electrical parameters.

5. The control method according to claim 1, wherein said determining the current air duct blockage state based on the current air duct parameter comprises:

determining the current air duct blockage state based on the current air duct parameter and a pre-stored correspondence between air resistances and air duct parameters.

6. The control method according to claim 1, wherein said adjusting the rotational speed of the fan based on the target air volume comprises:

increasing the rotational speed of the fan when the target air volume is lower than a preset threshold.

* * * * *